United States Patent
Cepulis

(10) Patent No.: US 8,688,933 B2
(45) Date of Patent: Apr. 1, 2014

(54) FIRMWARE COMPONENT MODIFICATION

(75) Inventor: Darren J. Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1322 days.

(21) Appl. No.: 11/514,010

(22) Filed: Aug. 31, 2006

(65) Prior Publication Data

US 2008/0059730 A1 Mar. 6, 2008

(51) Int. Cl.
*G06F 12/00* (2006.01)
*G06F 9/44* (2006.01)

(52) U.S. Cl.
USPC .................... 711/161; 711/E12.103; 717/168

(58) Field of Classification Search
USPC .......................................... 711/161; 717/168
See application file for complete search history.

(56) References Cited

U.S. PATENT DOCUMENTS

| | | | |
|---|---|---|---|
| 4,980,836 A | 12/1990 | Carter et al. | |
| 5,014,193 A | 5/1991 | Garner et al. | |
| 5,144,551 A | 9/1992 | Cepulis et al. | |
| 5,253,358 A | 10/1993 | Thoma, III et al. | |
| 5,297,231 A | 3/1994 | Miller | |
| 5,392,436 A | 2/1995 | Jansen et al. | |
| 5,410,706 A | 4/1995 | Farrand et al. | |
| 5,465,360 A | 11/1995 | Miller et al. | |
| 5,491,788 A | 2/1996 | Cepulis et al. | |
| 5,497,497 A | 3/1996 | Miller et al. | |
| 5,537,540 A | 7/1996 | Miller et al. | |
| 5,590,292 A | 12/1996 | Wooten et al. | |
| 5,596,759 A | 1/1997 | Miller et al. | |
| 5,611,078 A | 3/1997 | Miller et al. | |
| 5,687,388 A | 11/1997 | Wooten et al. | |
| 5,729,675 A | 3/1998 | Miller et al. | |
| 5,737,585 A * | 4/1998 | Kaneshima | 703/20 |
| 5,737,604 A | 4/1998 | Miller et al. | |
| 5,748,940 A | 5/1998 | Angelo et al. | |
| 5,822,512 A | 10/1998 | Goodrum et al. | |
| 5,836,013 A | 11/1998 | Green et al. | |
| 5,848,289 A | 12/1998 | Studor et al. | |
| 5,854,905 A | 12/1998 | Garney | |
| 5,860,142 A | 1/1999 | Cepulis | |
| 5,867,703 A | 2/1999 | Miller et al. | |
| 5,870,602 A | 2/1999 | Miller et al. | |
| RE36,189 E | 4/1999 | Carter et al. | |
| 5,574,915 A | 8/1999 | Anderson et al. | |
| 5,938,766 A | 8/1999 | Lin et al. | |
| 6,055,596 A | 4/2000 | Cepulis | |
| 6,061,754 A | 5/2000 | Cepulis et al. | |
| 6,085,299 A | 7/2000 | Angelo et al. | |
| 6,223,271 B1 | 4/2001 | Cepulis | |
| 6,237,091 B1 * | 5/2001 | Firooz et al. | 713/1 |
| 6,314,515 B1 | 11/2001 | Miller et al. | |

(Continued)

OTHER PUBLICATIONS

Firmworks, FirmWorks Open Firmware Features, http://www.firmworks.com/ofwfeatures.htm, Aug. 28, 2006, pp. 1-6.

(Continued)

*Primary Examiner* — Reginald Bragdon
*Assistant Examiner* — Aracelis Ruiz

(57) ABSTRACT

Systems, methods, and other embodiments associated with firmware modification are described. One system embodiment includes modification utility configured to modify a less-than whole portion of the archive based on a modification request. The system embodiment may also include a nonvolatile memory containing an archive of one or more firmware components.

19 Claims, 9 Drawing Sheets

(56) References Cited

U.S. PATENT DOCUMENTS

| | | |
|---|---|---|
| 6,397,268 B1 | 5/2002 | Cepulis et al. |
| 6,456,502 B1 | 9/2002 | Miller et al. |
| 6,463,529 B1 | 10/2002 | Miller et al. |
| 6,463,550 B1 | 10/2002 | Cepulis et al. |
| 6,496,945 B2 | 12/2002 | Cepulis et al. |
| 6,832,372 B1 | 12/2004 | Fry et al. |
| 6,874,103 B2 | 3/2005 | Cepulis |
| 6,961,791 B2 | 11/2005 | Cepulis |
| 7,017,040 B2 | 3/2006 | Ginter et al. |
| 7,987,449 B1 * | 7/2011 | Marolia et al. ........... 717/120 |
| 2003/0066062 A1 * | 4/2003 | Brannock et al. ........... 717/169 |
| 2004/0148379 A1 * | 7/2004 | Ogura ........... 709/223 |
| 2005/0177709 A1 * | 8/2005 | Kim ........... 713/1 |
| 2005/0210222 A1 | 9/2005 | Liu et al. |
| 2006/0031664 A1 * | 2/2006 | Wilson et al. ........... 713/1 |
| 2006/0059300 A1 * | 3/2006 | Hsu et al. ........... 711/112 |
| 2006/0075215 A1 | 4/2006 | Rawe et al. |
| 2006/0143600 A1 * | 6/2006 | Cottrell et al. ........... 717/168 |
| 2008/0028385 A1 * | 1/2008 | Brown et al. ........... 717/170 |

OTHER PUBLICATIONS

Firmworks, Open Firmware, http://www.firmworks.com/www/featlist.htm, Aug. 28, 2006, pp. 1-10.

Compaq, Compaq Online ROM Flash, User Guide, Part No. 216315-006, Aug. 2002, pp. 1-62, Compaq.

Pountain et al., Extensible Software Systems, Byte Articles, May 1994, pp. 1-6, CMP Media, LLC.

\* cited by examiner

FIRMWARE COMPONENT MODIFICATION

BACKGROUND

Firmware includes computer code (e.g., software) that is stored in an electronic device to control the operation of that device. Firmware is generally stored in nonvolatile memory such as read-only memory (ROM), programmable read-only memory (PROM), erasable programmable read-only memory (EPROM), electrically erasable programmable read-only memory (EEPROM) and the like. Flash memory is a type of EEPROM that can be erased and reprogrammed in block-sized amounts rather than byte by byte, thus making it typically faster to reprogram than a traditional EEPROM.

The firmware is executed when the device is started (e.g., boot process). Execution of the firmware can cause the device to be configured to control the operation of the device.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
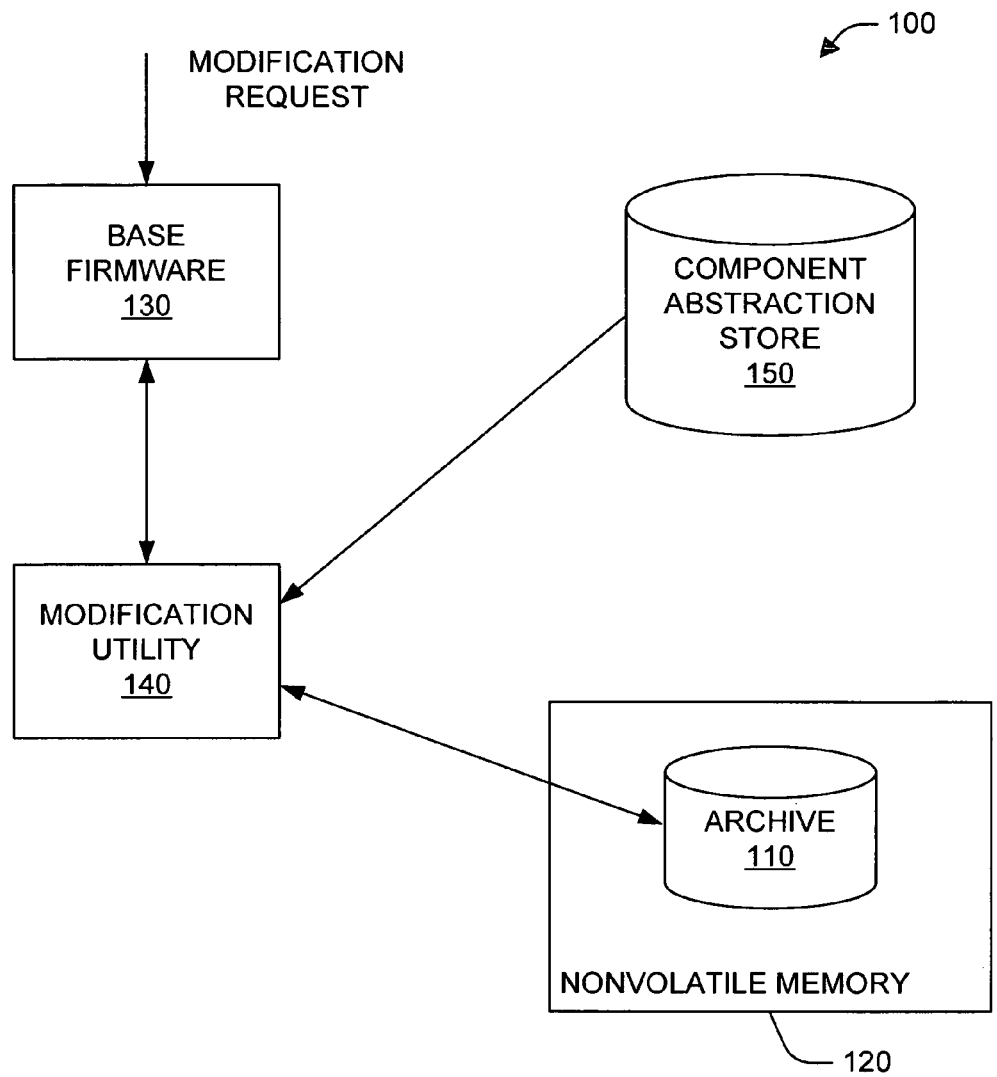
FIG. 1 illustrates an example firmware modification system.

Example systems, methods, computer-readable media, software and other embodiments are described herein that relate to firmware component modification. In one embodiment, a firmware modification system employs an archive of firmware components which can be modified (e.g., individually). The archive thus provides flexibility and extensibility to the system firmware as individual firmware component(s) can be added, modified and/or removed without altering the entire system ROM.

The firmware modification system can further include a modification utility to modify the archive based on a modification request (e.g., user input). A component abstraction store maintains information associated with the archive (e.g., address) along with information associated with the firmware component(s) stored in the archive. Thereafter, the modified archive can be utilized, for example, during the next power-on self test and/or system boot.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), CD-ROM (Compact Disk ROM), and so on.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a machine-readable medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

FIG. 1 illustrates a firmware modification system 100 that is configured to modify one or more firmware components. The firmware modification system 100 includes an archive 110 of firmware components which can be modified (e.g., individually). The firmware component(s) can include, for example, microcode patch(es), diagnostic information, debugging information, extensible firmware interface driver(s), power-on self test, system management interrupt information, option ROM(s) and the like. As individual firmware component(s) can be added, modified and/or removed without altering the entire system ROM, the firmware modification system 100 is flexible and extensible.

Conventionally, a system ROM is updated/modified monolithically. That is, system ROM updates are generally accomplished by updating an entire set of new firmware. Testing of the entire set of new firmware can be frustrating and time consuming. Additionally, modification of the entire system ROM can lead to problem(s) (e.g., "unintended side effects").

With firmware component(s), the particular modified firmware component(s) can be tested and released. Further by employing firmware component(s), the firmware modification system 100 can support the release of a modified component for a generation of similar platforms as opposed to the release of a entire ROM set for each platform as with convention systems.

The archive 110 of firmware components can be stored in a nonvolatile memory 120 and can be updated by a modification utility 140 independently of a base firmware 130. While the base firmware 130 can be stored in a nonvolatile memory, in one example, the base firmware 130 and the archive 110 are stored in separate banks of the nonvolatile memory 120 with each bank independently programmable. In another example, the base firmware 130 and the archive 110 are stored in physically and/or logically separate nonvolatile memories. The system 100 can, optionally, include the base firmware 130.

The base firmware 130 can be employed to boot a computer system and can initiate modification of the archive 110 via the modification utility 140, for example, based upon a modification request. The modification request can be received from an administrator (e.g., command line instruction (unattended) and/or via a graphical user input (manual)). Additionally and/or alternatively, the modification request can be received from a remote computer system. The modification request can include can identify one or more component(s) of the archive 110 desired to be modified.

The firmware modification system 100 further includes a component abstraction store 150 (e.g., table) that stores information associated with the archive 110 and/or firmware component(s) stored in the archive 110. The component abstraction store 150 can describe to the modification utility 140 which functional modules the ROM is aware of (and supports) and where the individual modules (e.g., components) are located in the ROM. In one example, the component abstraction store 150 is stored in a boot block.

In one example, the component abstraction store 150 can store information associated with the archive 110, for example, an address and/or size (e.g., multiple of ROM flash blocks) of the archive 110. Additionally, the component abstraction store 150 can store information associated with individual firmware component(s) stored in the archive 110.

For example, the component abstraction store 150 can store information (e.g., names/identifiers) for locating the one or more firmware components stored in the archive 110. In one example, component(s) can be added to and/or extracted from the archive 110 using a predefined tag such as a name of a component (e.g., binary module). The modification utility 140 can scan the archive 110 and extract component(s) as needed, based on these tags. In another example, component(s) in the archive 110 do not reside at hard-coded offsets and thus can be compressed, added and/or removed.

In one example, the component abstraction store 150 can store a description and/or required warning(s) and/or dependency information, if any, for one or more of the firmware components. In one example, dependent component(s), if any, are handled together as part of a single update process (e.g., listed as part of a modification request).

The component abstraction store 150 can further store information (e.g., flags) indicating whether or not a particular component can be removed from the archive 110. Additionally, the component abstraction store 150 can store a maximum size (e.g., uncompressed) of a particular component. In yet another example, the component abstraction store 150 can store a firmware component's hard-coded address in ROM (e.g., not compressed) and/or the firmware component's address in the archive 110 (e.g., compressed).

Figure 2:
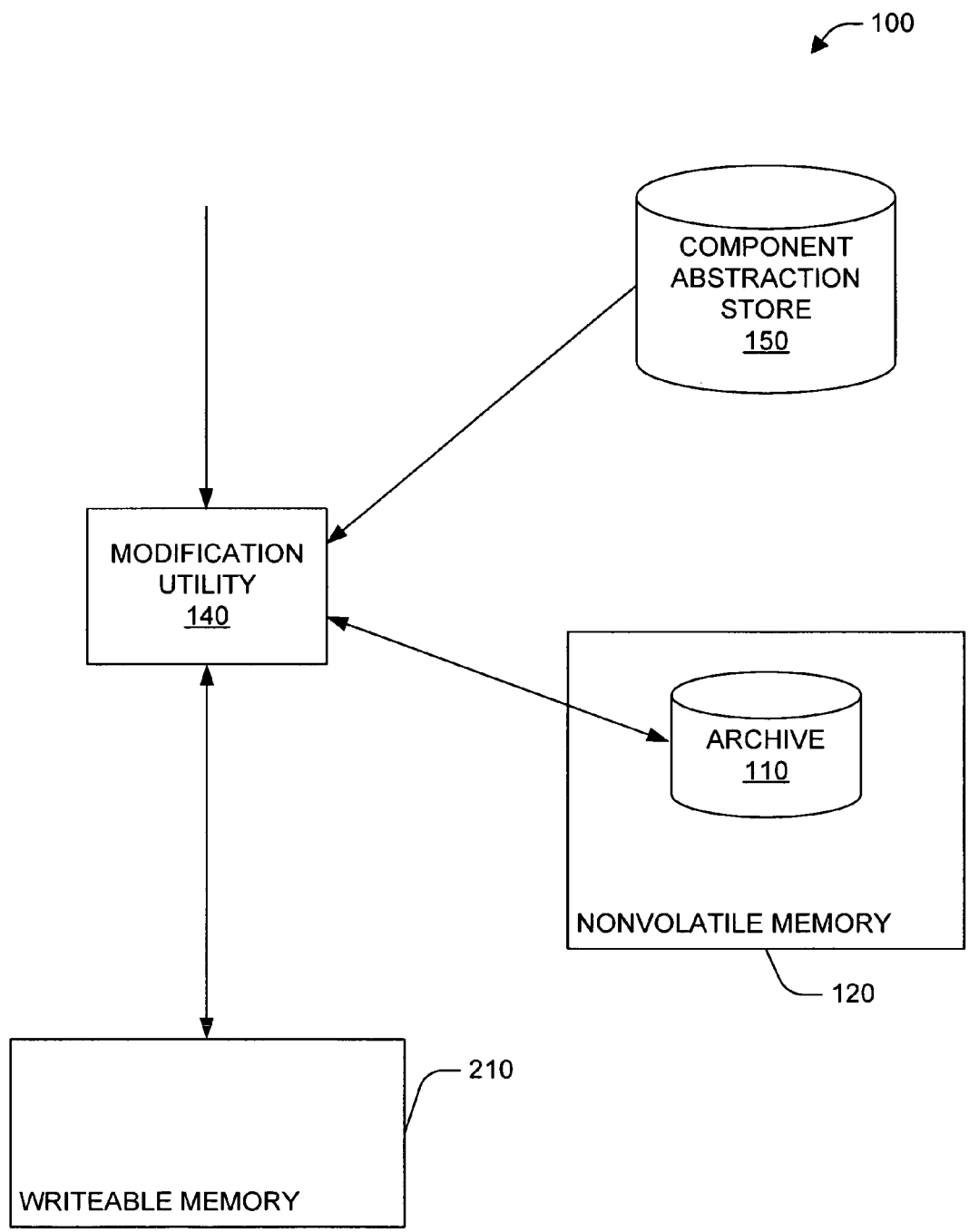
FIG. 2 illustrates an example firmware modification system.

The component abstraction store 150 can be employed by the modification utility 140 which is configured to modify a less-than-whole portion of the archive 110 based on a modification request received from the base firmware 130. As shown in FIG. 2, the system 100 can further optionally include a writeable memory 210 which the modification utility 140 can utilize during the process of modifying the archive 110.

In one example, the modification utility 140 retrieves information associated with the archive 110 from the component abstraction store 150. For example, the modification utility 140 can retrieve a physical address and size of the archive 110 (e.g., a multiple of ROM flash blocks) from the component abstraction store 150. Based on the information retrieved from the component abstraction store 150, the modification utility 140 can then copy the archive 110 from the nonvolatile memory 120 to the writeable memory 210.

Next, the modification utility 140 can identify one or more firmware components in the archive 110 to be modified based on a modification request. Thereafter, the modification utility 140 can modify the identified firmware component(s) in the copy of the archive stored in writeable memory 210. The modification utility 140 can then replace (e.g., flash) the archive 110 with the copy of the archive stored in writeable memory 210. The modified archive 110 can be utilized during the next power-on self test and/or system boot. Since the individual firmware component(s) stored in the archive 110 can be modified independently, flexibility and extensibility can be provided to system firmware.

In one example, prior to replacing the archive 110, the modification utility 140 can confirm that the modified firmware component(s) are supported by the system ROM. Additionally, the modification utility 140 can determine whether the modified copy of the archive stored in writeable memory 210 is within the archive 140 limits (e.g., physical size) based, for example, upon information stored in the component abstraction store 150 (e.g., size of the archive 110).

In one embodiment, a monolithic update to the system firmware preserves and/or updates substantially all non-removable components; however, the system 100 does not allow for them to be removed from the archive 110.

Figure 3:
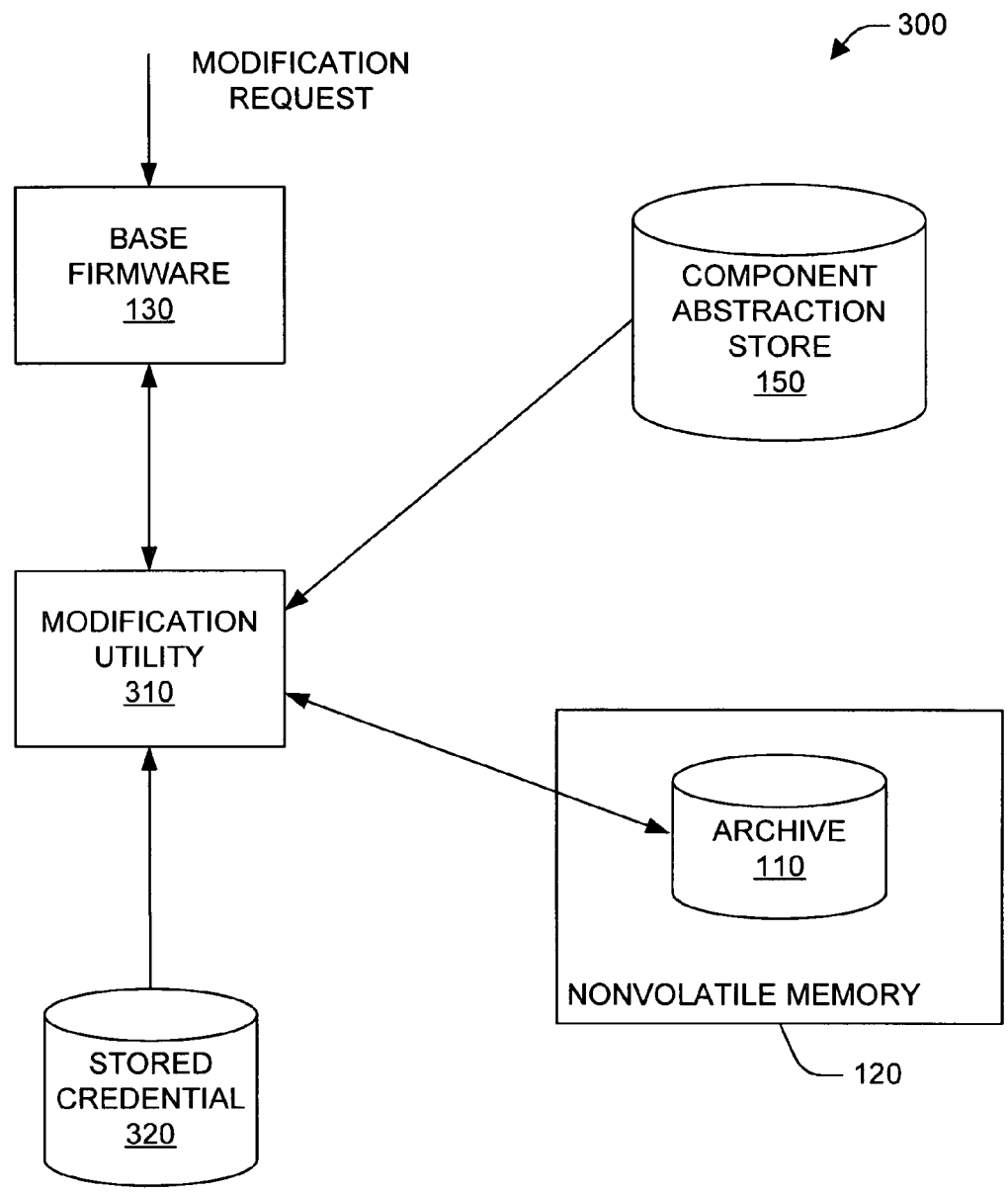
FIG. 3 illustrates an example firmware modification system.

FIG. 3 illustrates a firmware modification system 300 that is configured to modify one or more firmware components. The system 300 includes an archive 110 stored in nonvolatile memory 120 and a component abstraction store 150, as discussed previously.

However, a modification utility 310 is configured to access a stored credential 320. In one example, a modification request can include a credential (e.g., password) which the modification utility 310 can compare to the stored credential 320 to determine whether or not the requested modification is permitted. If the proper credential (e.g., password) is presented, the modification is permitted to occur. If the proper credential (e.g., password) is not presented, the modification is not permitted to occur, as discussed previously.

In another example, upon receipt of a modification request, the modification utility 310 determines whether a particular stored credential 320 (e.g., licensing key) is present. If the stored credential 320 is present, the modification is permitted to occur. Otherwise, the modification is not permitted to occur.

In one example, the stored credential 320 (e.g., licensing key) that enables a particular flash component can reside in the archive 110 itself as a separate component. Even though a particular ROM code component is present, the run-time or boot-up code of the nonvolatile memory 120 will not enable it or use it if it requires a stored credential 320 (e.g., licensing key) to be present and the stored credential 320 (e.g., key) is not there.

In one embodiment, the system ROM can ship with some and/or all functional components already present, and certain components are enabled via the flash in of a stored credential 320 (e.g., licensing key) to enable them for run-time and/or boot-up use. A component's need for a stored credential 320 (e.g., licensing key) can be described in the component abstraction store 150. This stored credential 320 (e.g., licensing key) can further be described in the component abstraction store 150 as being non-removable once it is flashed in.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 4:
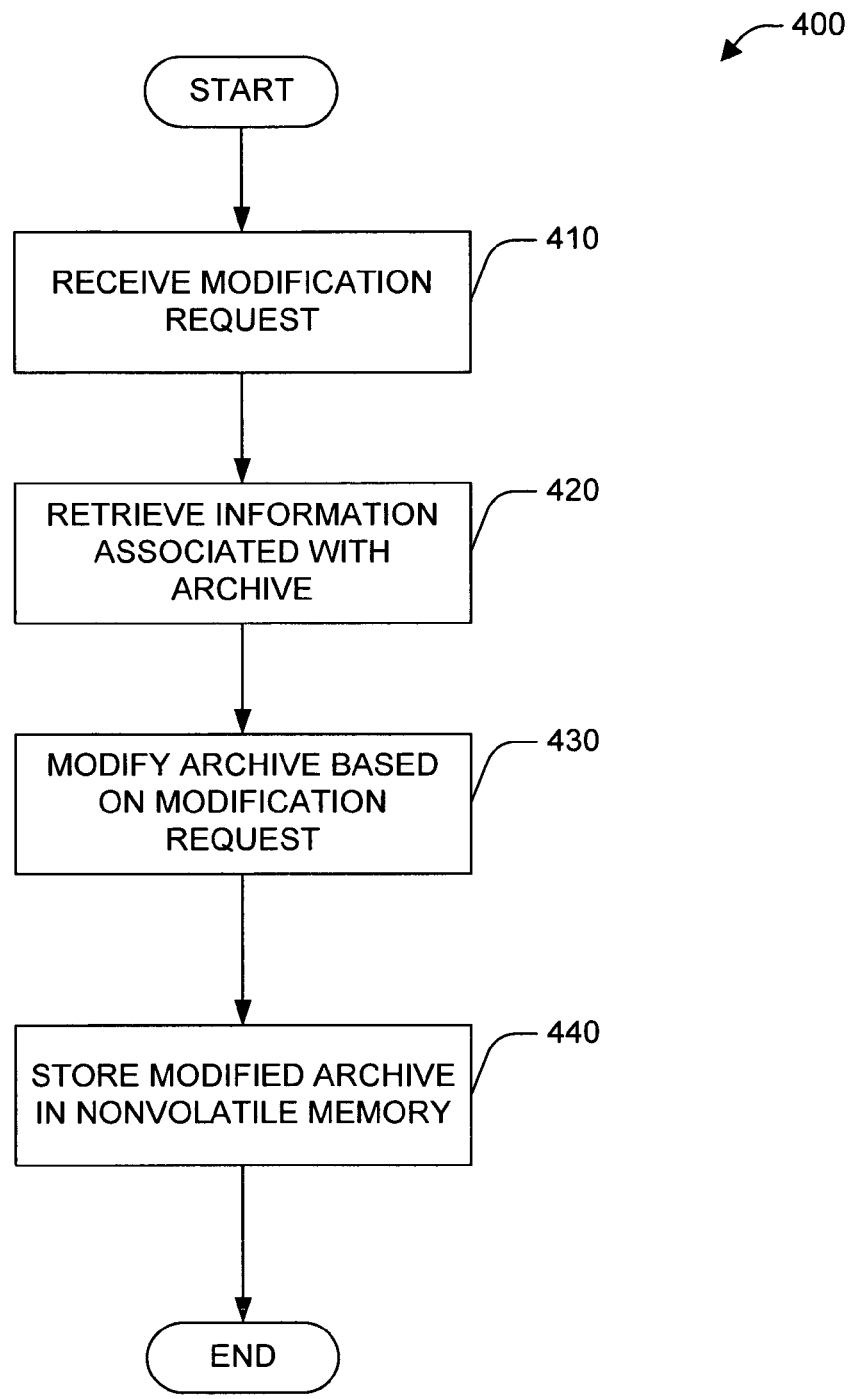
FIG. 4 illustrates an example method of modifying system firmware.

FIG. 4 illustrates an example method 400 of modifying system firmware. At 410, a modification request is received. For example, the modification request can be received as part of a command line and/or received via a graphical user interface, as discussed in greater detail below.

At 420, information associated with an archive of firmware components is retrieved from a nonvolatile memory. The archive can be retrieve based upon information stored in a component abstraction store. The archive can store information associated with one or more firmware components. At 430, the archive is modified based on the modification request. At 440, the modified archive is stored in the nonvolatile memory and the method 400 ends.

Figure 5:
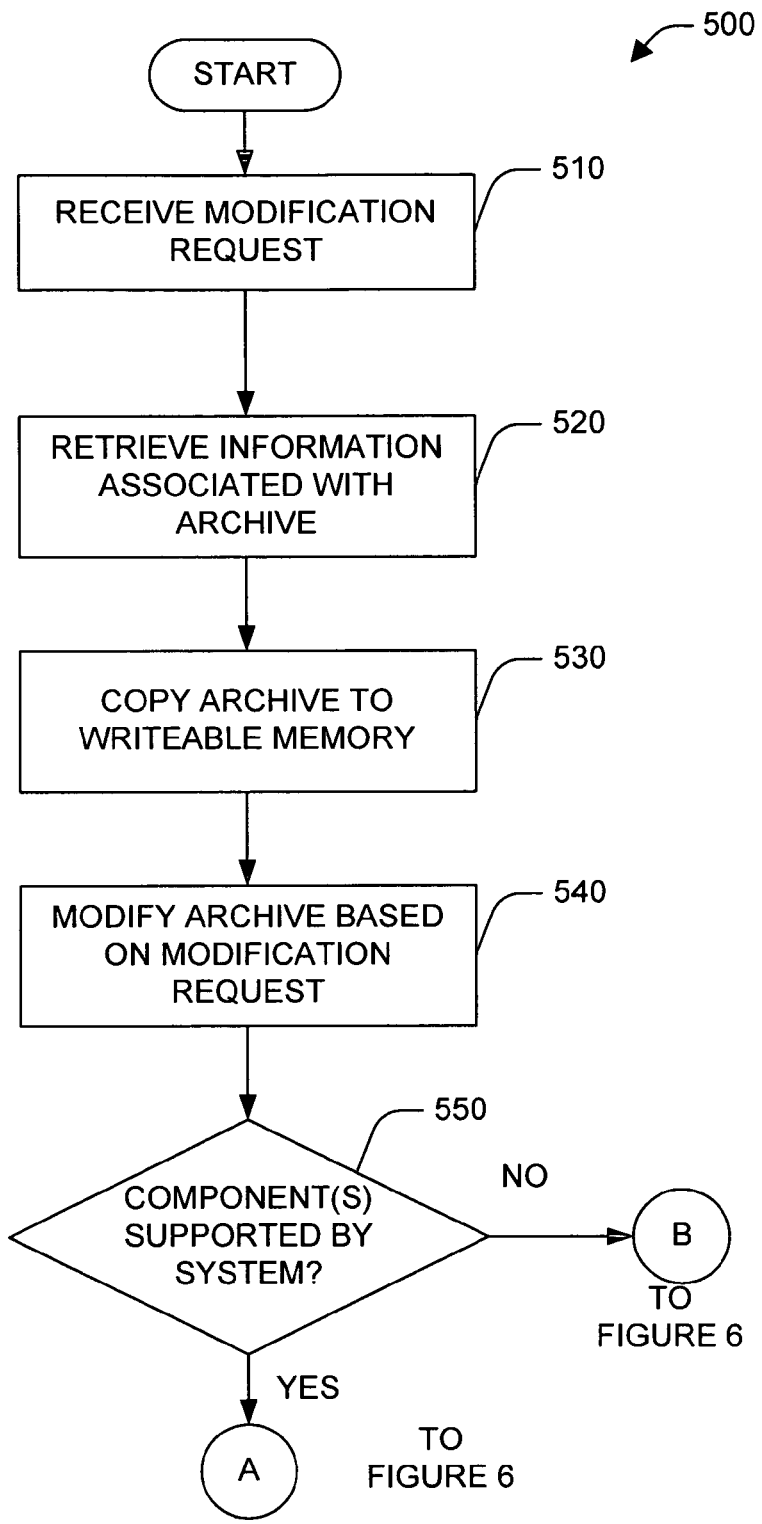
FIG. 5 illustrates an example method of modifying system firmware.
Figure 6:
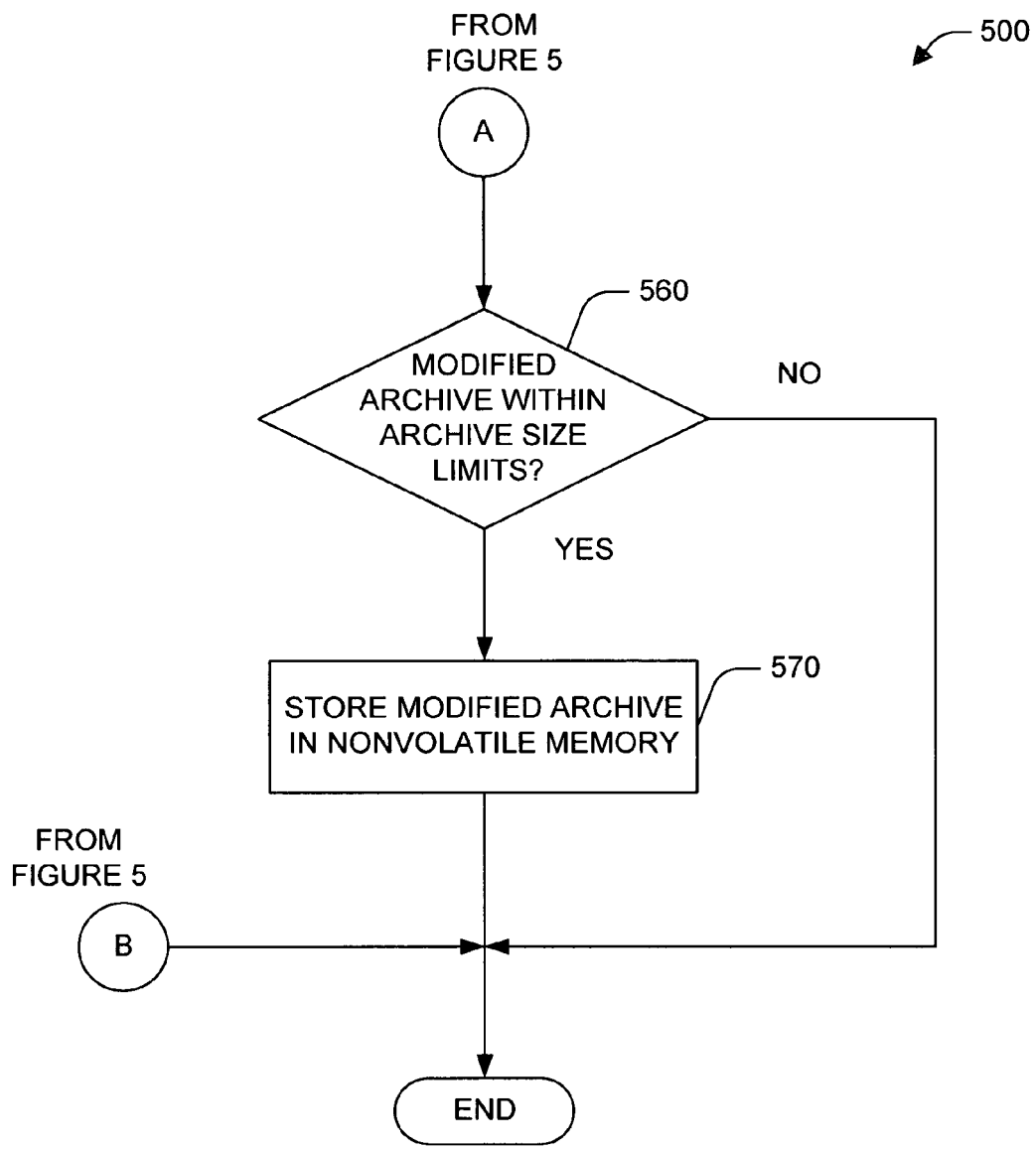
FIG. 6 further illustrates the method of FIG. 5.

FIGS. 5 and 6 illustrate a method 500 of modifying system firmware. At 510, a modification request is received, for example, from a user. At 520, information associated with an archive of firmware components is retrieved from a nonvolatile memory. At 530, the archive is copied to writeable memory (e.g., nonvolatile memory). At 540, the copy of the archive in writeable memory is modified based upon the modification request.

At 550, a determination is made as to whether the modified component(s) are supported by the system ROM. If the determination at 550 is NO, the modified archive is not stored in nonvolatile memory and the method 500 ends. If the determination at 550 is YES, at 560, a determination is made as to whether the modified archive is within archive size limits (e.g., based on information stored in a component abstraction store).

If the determination at 560 is NO, the modified archive is not stored in the nonvolatile memory and the method 500 ends. If the determination at 560 is YES, at 570, the modified archive is stored in the nonvolatile memory, and, the method 500 ends.

Figure 7:
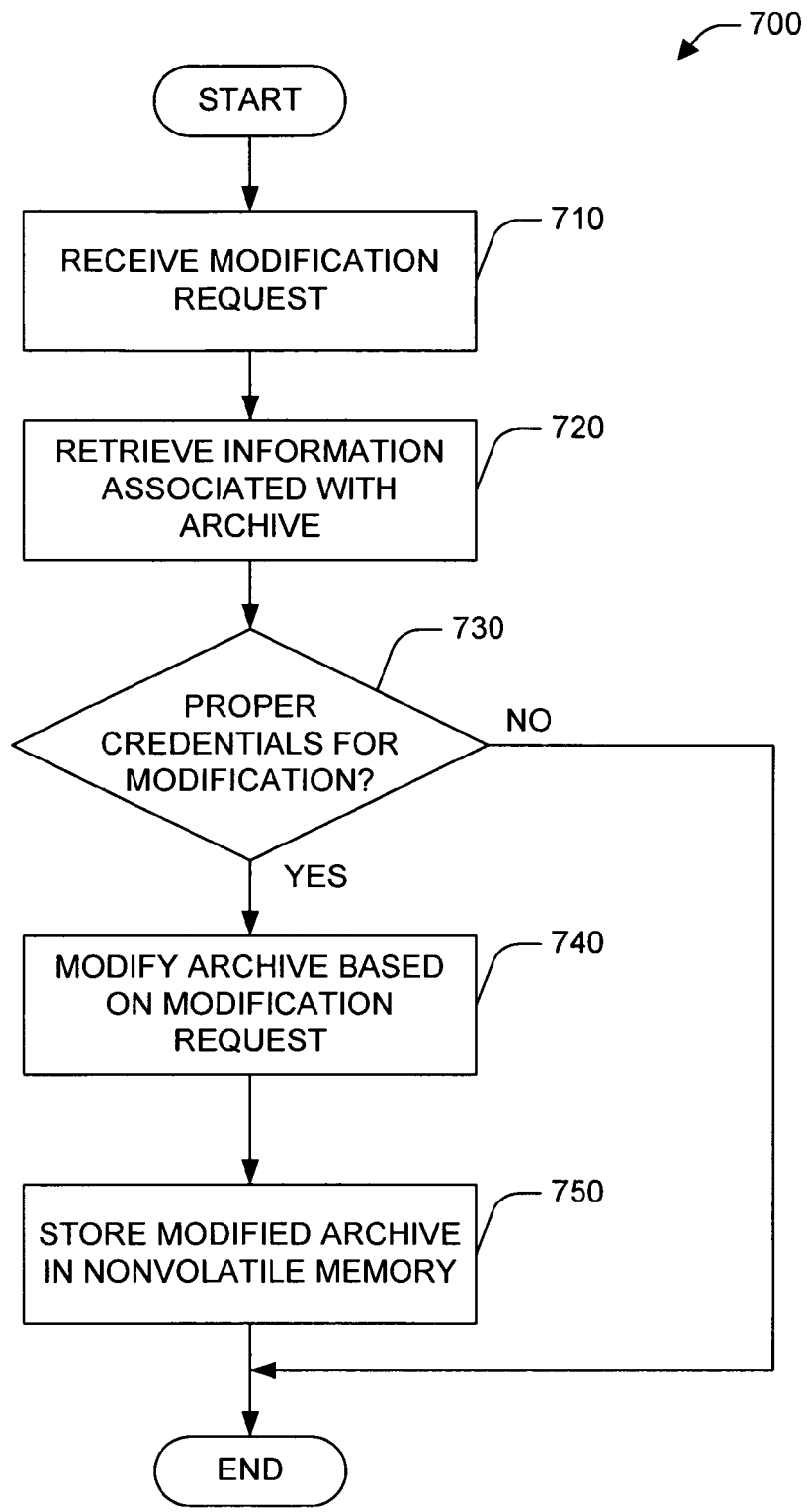
FIG. 7 illustrates an example method of modifying system firmware.

FIG. 7 illustrates a method 700 of modifying system firmware. A credential such as a license key, a password and the like is employed to limit unauthorized modification of system firmware.

At 710, a modification request is received. At 720, information associated with an archive is retrieved from a nonvolatile memory. At 730, a determination is made as to a proper credential is present for the requested modification. In one example, a password is included with the modification request and compared with a stored password. In another example, the credential is a licensing key.

If the determination at 730 is NO, the method 700 ends. If the determination at 730 is YES, at 740, the archived is modified based on the modification request. At 750, the modified archive is stored in the nonvolatile memory and the method 700 ends.

In one example, the method 700 may be implemented as processor executable instructions. Thus, in one example, a machine-readable medium may store processor executable instructions that if executed by a machine (e.g., processor) cause the machine to perform a method that includes the method 700. While the above method is described being stored on a machine-readable medium, it is to be appreciated that other example methods described herein may also be stored on a machine-readable medium.

Figure 8:
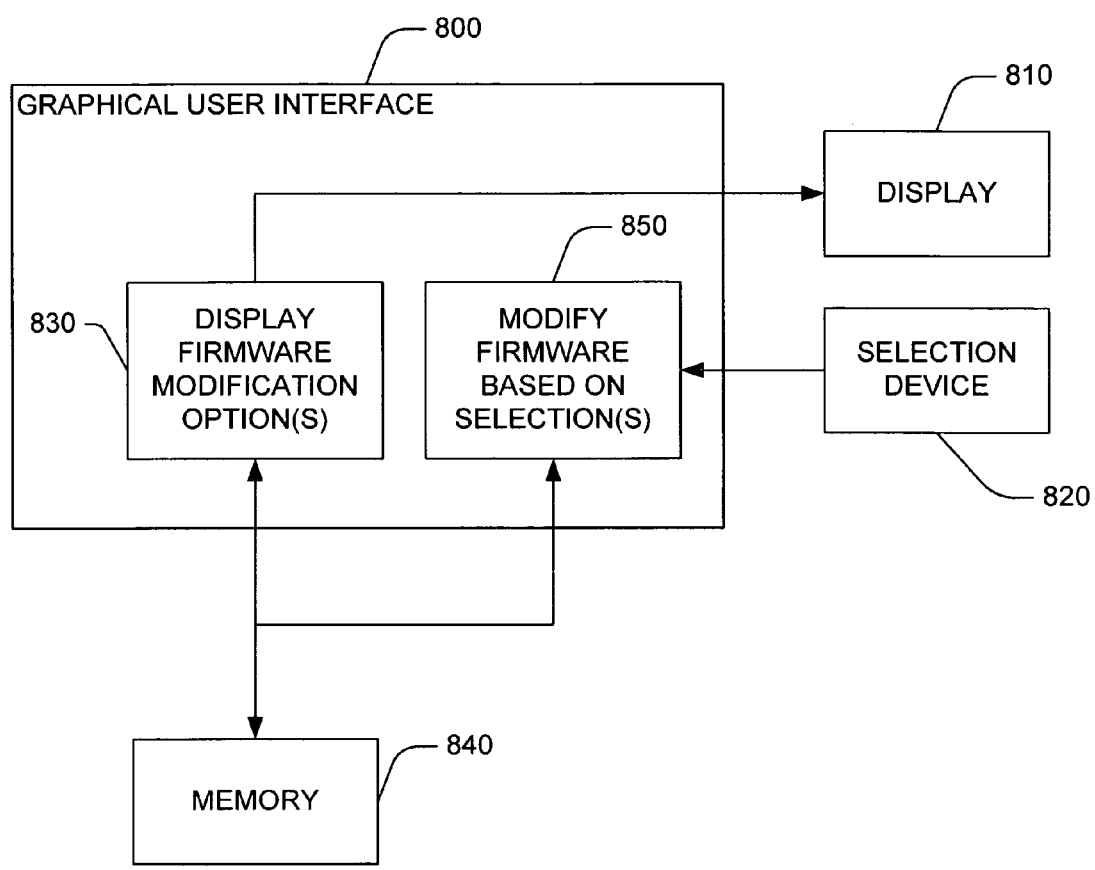
FIG. 8 illustrates an example graphical user interface.

With reference to FIG. 8, an example graphical user interface 800 is illustrated that can be configured to perform the method of FIGS. 3, 4, 5, 6 and/or 7 (or a similar method) on a computer system. An example computer system can include at least a display 810 and a selection device 820 that can interface and operate with the graphical user interface 800. The graphical user interface 800 can be embodied as software provided by a computer-readable medium having processor executable instructions. The instructions can be operable to perform a method of providing and selecting from a set of data entries on the display 810 that cause a system firmware to be modified.

The graphical user interface 800 can include executable instructions 830 configured to cause the computer to retrieve a set of data entries, where a data entry represents system firmware component option(s) and/or system firmware port settings. For example, current port mode settings can be read from a memory 840 (e.g., system ROM). The system firmware component option(s) can then be caused to be displayed on the display 810.

Executable instructions 850 can be configured to cause the computer to respond to one or more data entry selection signals that are received indicative of the selection device 820 selecting one or more data entries from the set of data entries displayed (e.g. clicking on and selecting a system firmware component option, pressing a key to modify a system firmware component, and the like). In response to the one or more data entry selection signals, one or system firmware component modifications can be programmatically changed by storing and/or modifying the mode settings in the memory 840. This can include, for example, modifying an archive of firmware components.

The graphical user interface 800 can be embodied as processor executable instructions that can be initiated, for example, during a set-up mode. As another example, the graphical user interface 800 may be part of a configuration application and/or control panel software that allows a user to review and modify system firmware components.

Figure 9:
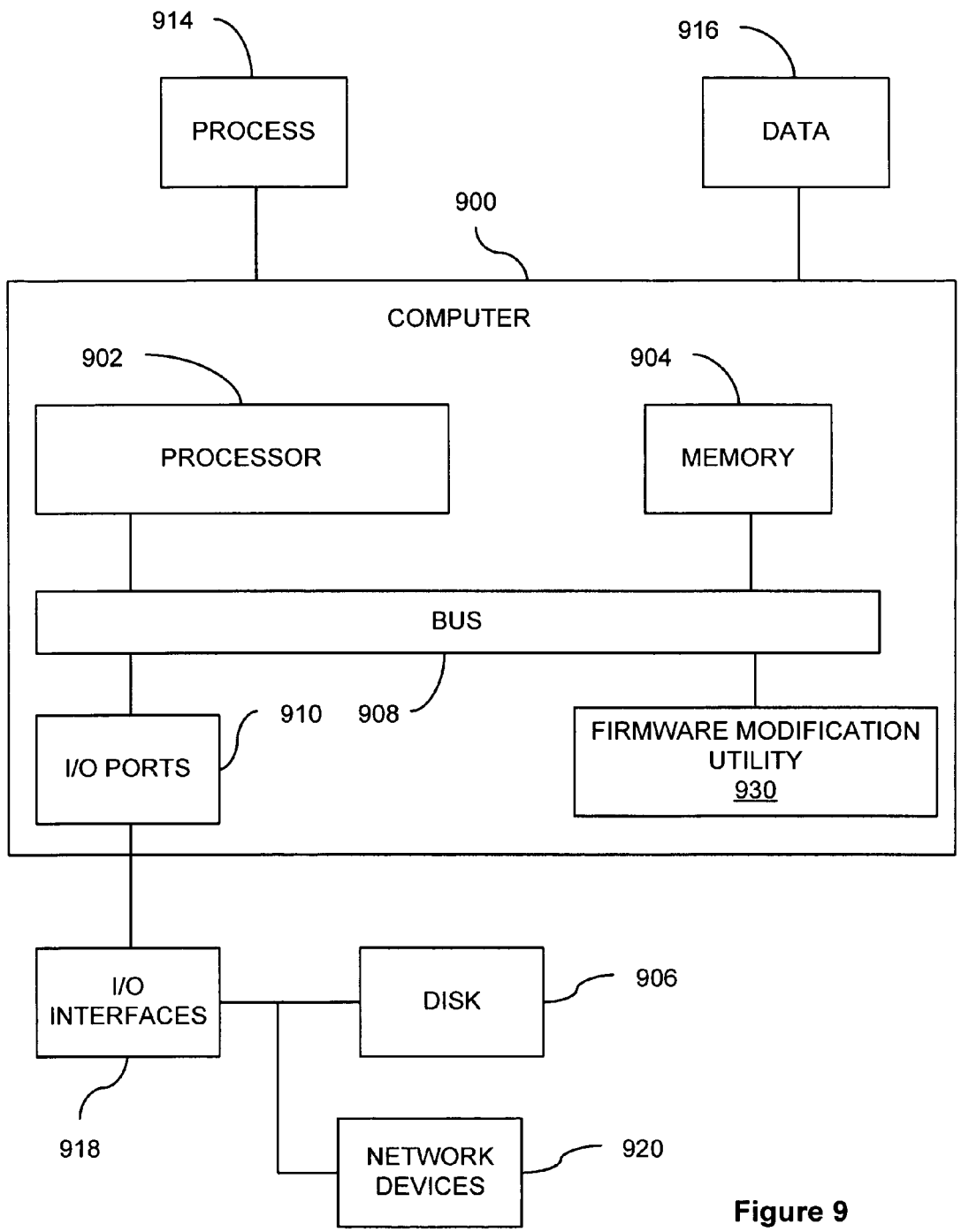
FIG. 9 illustrates an example computing environment in which example systems and methods illustrated herein may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include a firmware modification utility 930 configured to facilitate modification of system firmware. In different examples, the firmware modification utility 930 may be implemented in hardware, software, firmware, and/or combinations thereof. Thus, the firmware modification utility 930 may provide means (e.g., hardware, software, firmware) for modifying system firmware. While the firmware modification utility 930 is illustrated as a hardware component attached to the bus 908, it is to be appreciated that in one example, the firmware modification utility 930 could be implemented in the processor 902.

Generally describing an example configuration of the computer 900, the processor 902 may be a variety of various processors including dual microprocessor and other multiprocessor architectures. A memory 904 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, and/or a memory stick. Furthermore, the disk 906 may be a CD-ROM, a CD recordable drive (CD-R drive), a CD rewriteable drive (CD-RW drive), and/or a digital video ROM drive (DVD ROM). The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, SATA, Infiniband, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A firmware modification system comprising:
a nonvolatile memory containing an archive of one or more firmware components;
a component abstraction store comprising information for locating the one or more firmware components stored in the archive; and
a modification utility configured to modify a less-than-whole portion of the archive based on a modification request, comprising:
copying the archive from the nonvolatile memory to a writeable memory;
identifying a location of a firmware component in the archive to be modified based on information stored in the component abstraction store;
determining whether a credential is present for the modification request;
upon a determination that the credential is present for the modification request;
modifying the firmware component in the copy of the archive in writeable memory to create a modified archive; and
replacing the archive in the nonvolatile memory with the modified archive;
in which the archive and a base firmware are stored in separate banks with each bank being independently programmable; the base firmware being employed to boot a computer system.

2. The firmware modification system of claim 1, where the nonvolatile memory is a flash memory and the archive of one or more firmware components defines one version of system firmware.

3. The firmware modification system of claim 1, where the archive and the base firmware are stored in physically separate nonvolatile memories.

4. The firmware modification system of claim 1, where the component abstraction store stores information associated with the one or more firmware components.

5. The firmware modification system of claim 4, where the information associated with the one or more firmware components comprises at least one of an identifier, a description, a warning, a maximum size, identification of firmware components that are to be updated together, firmware components that are not to be removed from the archive, and removal information.

6. The firmware modification system of claim 1, where the archive of one or more firmware components defines one entire set of firmware to operate in a system read only memory and the modification utility is configured to modify the less-than-whole portion of the one entire set of firmware.

7. The firmware modification system of claim 1, the modification utility stores the modified archive to the nonvolatile memory if the modification utility determines that the modified archive is within an archive size limit.

8. The firmware modification system of claim 1, the modification utility stores the modified archive to the nonvolatile memory if the modification utility determines that a proper credential is present.

9. The firmware modification system of claim 8, the modification utility compares a password included in the modification request with a stored credential to determine whether the proper credential is present.

10. The firmware modification system of claim 8, the credential is a licensing key stored in the archive.

11. The firmware modification system of claim 1, in which the component abstract store further comprises information describing which firmware components are dependent components, wherein the modification utility uses the information describing which firmware components are dependent components when modifying the less-than-whole portion of the archive based on the modification request.

12. A method for modifying system firmware, comprising:
retrieving information associated with an archive of firmware components, where the archive of firmware components defines one entire set of firmware to operate in a system read only memory in which the information comprises data defining which of a number of firmware components are dependent components that are to be modified under a single modification request;
copying the archive from a nonvolatile memory to a writeable memory;
modifying a less-than-whole portion of the copy of the archive in the writeable memory based on a modification request; and,
storing the modified archive in the nonvolatile memory;
in which the archive and a base firmware are stored in separate banks of the nonvolatile memory and each bank is independently programmable; the base firmware being employed to boot a computer system.

13. The method of claim 12, where the archive and base firmware are stored in physically separate nonvolatile memories.

14. The method of claim 12, further comprising:
determining whether one or more components of the modified archive are supported by a system; and,
storing the modified archive in the nonvolatile memory, if the one or more components are supported by the system.

15. The method of claim 12, further comprising:
determining whether the modified archive is within an archive size limit; and,
storing the modified archive in the nonvolatile memory, if the modified archive is within the archive size limit.

16. The method of claim 12, comprising receiving information about firmware components that are not to be removed from the archive.

17. A method for modifying system firmware, comprising:

receiving a modification request to modify a portion of system firmware;

retrieving information associated with an archive of firmware components where the archive of firmware components defines one entire set of the system firmware, the information comprising data describing which firmware components among the archive of firmware components are dependent on each other;

determining whether a proper credential is present for the modification request;

if the proper credential is present:
- modifying a less-than-whole portion of the archive based on a modification request; and,
- storing the modified archive in a nonvolatile memory;
- in which a nonvolatile memory comprises the archive and a base firmware with the archive and the base firmware stored in separate banks and each bank is independently programmable; the base firmware being employed to boot a computer system.

18. The method of claim 17, where determining whether a proper credential comprises comparing a password included in the modification request with a stored credential to determine whether the proper credential is present.

19. The method of claim 17, where the retrieved information contains information about firmware components that are not to be removed from the archive.

* * * * *